(12) United States Patent
Reasoner

(10) Patent No.: US 9,773,263 B2
(45) Date of Patent: Sep. 26, 2017

(54) CUSTOMIZING PRODUCTS

(75) Inventor: Kelly J. Reasoner, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1879 days.

(21) Appl. No.: 12/257,440

(22) Filed: Oct. 24, 2008

(65) Prior Publication Data

US 2010/0106540 A1   Apr. 29, 2010

(51) Int. Cl.
G06Q 30/06   (2012.01)

(52) U.S. Cl.
CPC ......... *G06Q 30/06* (2013.01); *G06Q 30/0621* (2013.01)

(58) Field of Classification Search
CPC ................ G06Q 30/0621; G06Q 30/0601
USPC ...................................... 705/26.5
See application file for complete search history.

(56) References Cited

U.S. PATENT DOCUMENTS

| | | | |
|---|---|---|---|
| 7,188,255 B1* | 3/2007 | Toh et al. | 713/191 |
| 7,802,246 B1* | 9/2010 | Kennedy et al. | 717/173 |
| 2003/0023963 A1* | 1/2003 | Birkholz et al. | 717/172 |
| 2003/0139199 A1 | 7/2003 | Kinnula et al. | |
| 2006/0159822 A1 | 7/2006 | Galal | |
| 2006/0167577 A1 | 7/2006 | Clark et al. | |
| 2007/0033568 A1* | 2/2007 | Barrieau et al. | 717/101 |

* cited by examiner

*Primary Examiner* — Ramsey Refai
(74) *Attorney, Agent, or Firm* — Trop, Pruner & Hu, P.C.

(57) ABSTRACT

To customize products, a first entity receives generic products from a supplier entity, wherein the generic products include base software. The first entity provides a customization component for at least a subset of the generic products. Base software in at least the subset of the generic products is executed at the first entity to interact with the customization component to customize at least one feature of at least the subset of generic products.

19 Claims, 2 Drawing Sheets

CUSTOMIZING PRODUCTS

BACKGROUND

A supplier of products, such as computer products, storage products, communications products, and so forth, can be a source or reseller of such products. In a typical supply chain, the supplier of products can in turn have one or more customers (referred to as "selling customers") who sell the products to further downstream customers (e.g., end users, distributors, retail stores, and so forth). In response to orders received from the further downstream customers, the selling customers submit corresponding orders to the supplier for products that are desired by the further downstream customers.

A typical product can have many features, with different downstream customers desiring different combinations of such features. If the burden is placed on the supplier to provide the many customizations that may be desired by downstream customers, then that may increase costs for the supplier, since the supplier would have to maintain and manage a potentially large inventory of differently customized products to ensure on-time delivery to the supplier's customers.

BRIEF DESCRIPTION OF THE DRAWINGS

Some embodiments of the invention are described, by way of example, with respect to the following figures.

DETAILED DESCRIPTION

Figure 1:
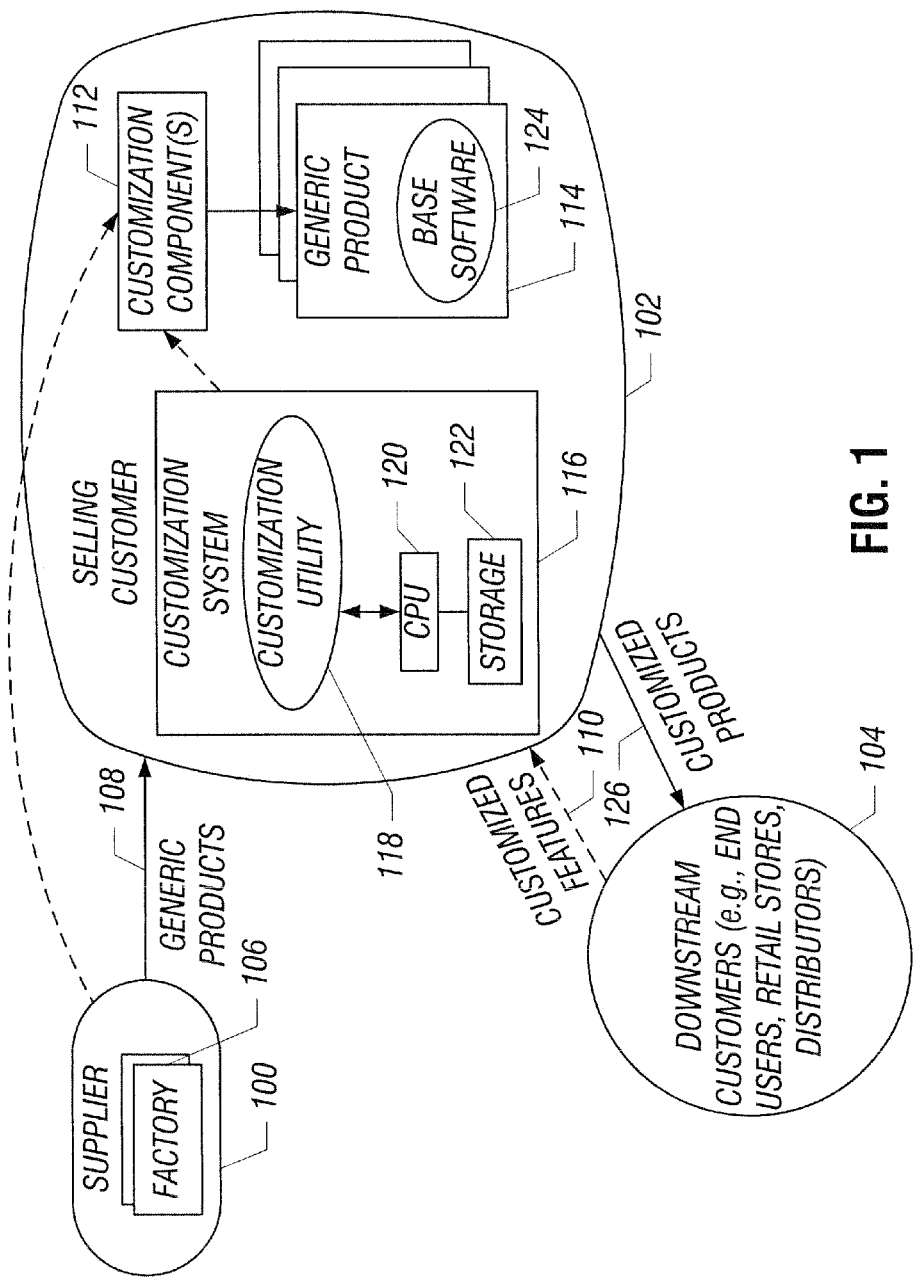
FIG. 1 illustrates an exemplary supply chain that includes a supplier, selling customers of the supplier, and downstream customers of the selling customer, in which an embodiment of the invention can be incorporated.

FIG. 1 is a schematic diagram of an exemplary supply chain that includes a supplier 100, a selling customer 102 that is a customer of the supplier, and downstream customers 104 (e.g., end users, retail stores, distributors, etc.) that are customers of the selling customer 102. Although just one selling customer 102 and one supplier 100 are depicted in FIG. 1, it is noted that multiple selling customers and multiple suppliers can be present. It is also noted that there may be an upstream supplier for the supplier 100, and/or that the downstream customers 104 can also in turn sell to other further downstream customers.

As depicted in FIG. 1, the supplier 100 (which can be a manufacturer or an intermediate entity that purchases products from a manufacturer) provides "generic" products along path 108 to the selling customer 102. "Generic" products refer to products that share a common collection of base features. Additional features can be added to generic products 114 located at the selling customer 102, or some of the features of the generic products 114 can be modified.

As depicted in the example of FIG. 1, one or more factories 106 are associated with the supplier 100, if the supplier 100 is a manufacturer of the generic products. However, note that the supplier 100 may have purchased the generic products from another entity, in which case the factories 106 would be associated with such other entity.

The selling customer 102 is able to receive orders from the downstream customers 104. An example of the supplier 100 is an original equipment manufacturer (OEM), and an example of the selling customer 102 is an OEM customer that purchases generic products from the OEM 100 and resells the products to the downstream customers 104. The downstream customers 104, and their orders, can specify customized features (path 110) for products desired by the downstream customers 104. For example, the downstream customers 104 can submit purchase orders (e.g., electronic purchase orders or paper-based purchase orders) along path 110 to the selling customer 102.

The selling customer 102 is provided with one or more customization components 112, which are used to customize generic products 114 at a facility of the selling customer 102. The customization component(s) 112 can be provided from the supplier 100, or alternatively, the customization component(s) 112 can be provided by a customization system 116 at the facility of the selling customer 102. The customization system 116 includes a customization software utility 118 that is executable on one or more central processing units (CPUs) 120 of the customization system 116. The CPU(s) 120 is (are) connected to a storage 122 of the customization system 116.

The customization system 116 can receive requested customized features from orders provided by the downstream customers 102. These customized features for products can be stored in the storage 122 of the customization system 116. Based on the requested customized features, the customization utility 118 can create the customization component(s) 112. Alternatively, as noted above, the customization component(s) 112 can be provided by the supplier 100.

The customization utility 118 can automatically create the customization component(s) 112. Alternatively, the customization utility 118 can be interactively used by an operator associated with the selling customer 102 to provide the customized features for the generic products 114 in the customization component(s) 112.

In some embodiments, each customization component 112 is a removable storage device, such as a Universal Serial Bus (USB) storage device, that contains customization data provided by the customization system 116 or by the supplier 100. The customization data on the removable storage device specifies the customization(s) (customized features in addition to or in place of base features) that is (are) to be applied to one or more generic products 114.

If the customization component 112 is a removable storage device, then the removable storage device 112 can be plugged (or otherwise inserted) into each generic product 114 that is to be customized using the customization data on the removable storage device 112. For example, a USB storage device can be plugged into a USB port of the generic product 114 such that the customization data on the USB storage device can be read.

Base software code 124 in each of the generic products 114 into which the removable storage device is plugged into can then read the customization data of the removable storage device 112. Features of the generic product 114 can then be customized based on the customization data. Note that one removable storage device 112 can be used to customize multiple generic products 114, in some examples. Alternatively, different removable storage devices 112 are used to customize corresponding generic products 114.

In an alternative embodiment, instead of providing a physical device such as a removable storage device for use as a customization component 112, it is noted that the customization component 112 can instead be considered customization data that is communicated over a network (wired or wireless) to the generic products 114. Thus, a "customization component" can either be a physical component or an abstract component (e.g., transmitted data).

Examples of features of the generic product 114 that can be added or modified include one or more user interfaces of the generic product 114. Customizing user interface(s) of a generic product 114 refers to customizing the "look and feel" of the generic product, which can be different for different downstream customers 104. For example, the user interfaces can be in the form of graphical user interface (GUI) display screens, such as control screens, management screens, and so forth. Different downstream customers 104 may desire different control or management screens, which may be associated with different combinations of control and/or management features (e.g., displayed icons, menus, etc.).

Another example of features that can be customized include default settings of the generic products 114. Default settings refer to the settings of the generic product that are provided unless changed by an end user of the generic product.

In one specific example, the generic products 114 are storage products, such as tape library systems. A control display screen provided on a tape library system can be the display screen displayed on a control panel of the tape library system, which is accessible by an operator to control the tape library system. The tape library system can also be coupled over a network to a remote management console, which can also provide a display screen to enable an operator to remotely perform management tasks with respect to the tape library system.

In other examples, the generic products 114 can be computer products, communication products, and others.

Once the base software 124 of each generic product 114 has interacted with the customization component 112 to customize one or more features of the products 114, the customized products can then be provided from the selling customer 102 (along path 126) to one or more downstream customers 104.

Note that the customized features of the products can be associated with corresponding unique identifiers. Such unique identifiers can be part of the customization data associated with the customization component 112. When a generic product 114 is customized using the customization data, the unique identifiers are transferred to the customized product to identify the corresponding unique features. The unique identifiers can be stored in a read-only memory of the product, for example. Once the unique identifiers and corresponding features are transferred to the product, the unique identifiers (and the corresponding features) cannot be changed (in some exemplary implementations). This prevents a downstream customer from changing customized features in an unauthorized or undesirable way. For example, if the customized feature is a user interface having the brand of company A, it may not be desirable to allow other customers to change the user interface to bear the brand of company B.

In the supply chain arrangement of FIG. 1, the supplier 100 does not have to be concerned with providing customized products that are specified in orders from downstream customers 104. As a result, the supplier 100 can maintain an inventory of generic products (instead of customized products), which reduces the supply complexity at the supplier 100, and moreover, allows the supplier 100 to maintain a smaller inventory than would be the case if the supplier 100 would have to maintain inventories of different customized products that are variations of the generic products.

Note that the supplier 100 can be the supplier of multiple types of generic products. With the supply chain technique according to some embodiments, the supplier 100 can maintain inventories of each type of generic product, without having to maintain inventories of customized products.

The responsibility of customizing products is shifted to the one or more selling customers 102 of the supplier 100. Each selling customer 102 is provided with a relatively efficient technique (in the form of the customization component(s) 112) of customizing features of the generic products. Thus, the selling customer 102 is able to customize the generic products on an as-needed basis for the downstream customers 104.

Figure 2:
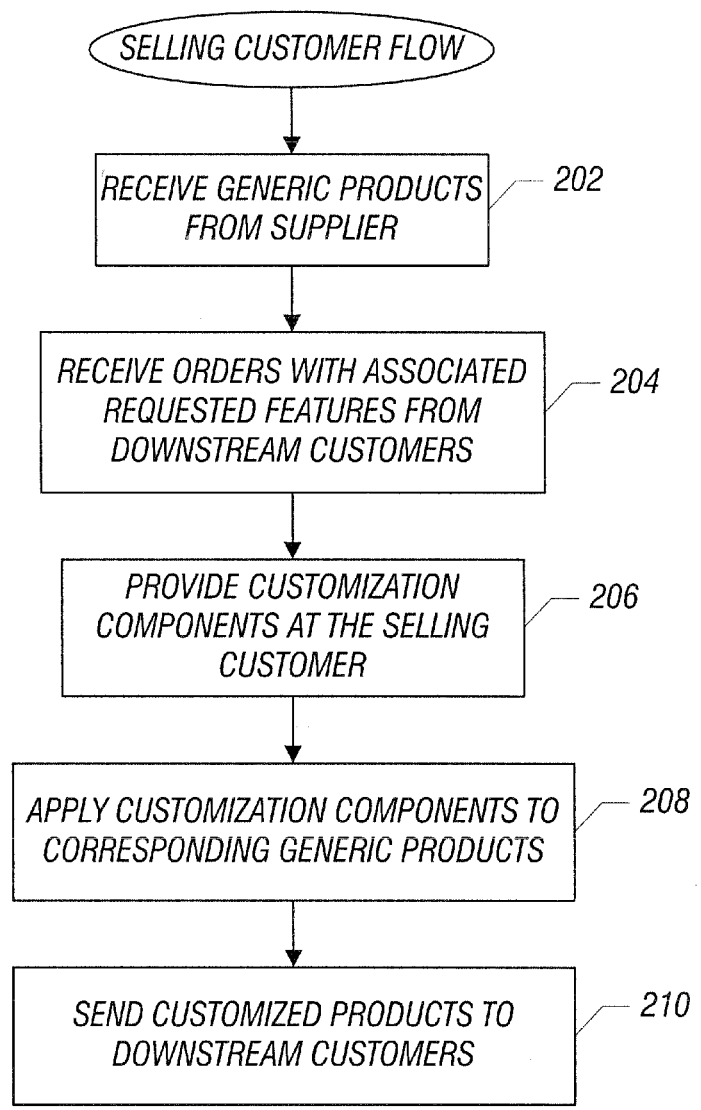
FIG. 2 is a flow diagram of a customization process for products provided by the supplier, in accordance with an embodiment.

FIG. 2 illustrates a flow of a procedure performed by the selling customer 102. The selling customer 102 receives (at 202) generic products from the supplier. The selling customer 102 also receives (at 204) orders (with corresponding requested features) for the products from downstream customers 104. Note that some of the orders will specify that certain downstream customers are requesting just the basic features, in which case, further customization of the products for these downstream customers would not have to be performed. However, other orders from other downstream customers can specify different combinations of customized features, which would cause the selling customer 102 to perform the customization of generic products according to some embodiments.

Customization components for performing such customization can be provided (at 206) at the selling customer 102. As discussed above, providing the customization components can be performed by the customization system 116, or alternatively, can be provided by the supplier 100. In some embodiments, the customization components are removable storage devices, such as USB devices, containing customization data, as explained above.

The customization components are then applied (at 208) to corresponding generic products. For example, a first customization component can be applied to a first subset of one or more generic products, a second customization component can be applied to a subset of one or more customization components, and so forth.

The customized products are then sent (at 210) to downstream customers.

By employing some embodiments of the invention, one or more of the following benefits may be provided. Management of products at the supplier 100 is made less complex, since the supplier 100 only has to be concerned with shipping generic products. A reduction in management of products at the supplier 100 helps to reduce costs to the supplier 100, and also reduces the amount of inventory that has to be kept by the supplier 100. The supply chain can be made simpler by using some embodiments of the invention for supplying products to different customers. Moreover, the selling customer can control the features that are made available to downstream customers.

Instructions of software described above (including the customization utility 118 of FIG. 1) are loaded for execution on a processor (such as one or more CPUs 120 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of customizing generic products received at a first entity from a supplier entity, wherein the generic products include base software, the method comprising:
    providing, at the first entity, a customization component for at least a subset of the generic products, where the subset includes plural ones of the generic products, wherein the customization component is based on at least one purchase order from a particular customer of the first entity, the at least one purchase order specifying product customization, and wherein the first entity has a plurality of customers including the particular customer; and
    causing execution of the base software in the subset of the generic products at the first entity to interact with the customization component to customize at least one feature of the subset of generic products, where the customizing of the at least one feature of the subset of generic products is performed without having the supplier entity perform the customizing.

2. The method of claim 1, wherein the first entity comprises a selling customer of the supplier entity, wherein the generic products are received at a facility of the first entity, and wherein causing the execution of the base software to interact with the customization component is performed at the facility of the first entity.

3. The method of claim 2, wherein the supplier entity is an original equipment manufacturer (OEM), and the selling customer comprises an OEM customer that supplies customized products to downstream customers, the customized products including the generic products in the subset customized by the customization component.

4. The method of claim 2, wherein the generic products are received from a factory of the supplier entity.

5. The method of claim 1, further comprising:
    providing, at the first entity, at least a second customization component for customizing generic products other than the subset of generic products, wherein the second customization component is based on at least a second purchase order from another customer of the first entity, the second purchase order specifying a different product customization; and
    at the first entity, causing execution of the base software at each of the other generic products to interact with the second customization component to customize at least another feature of the other generic products.

6. The method of claim 1, wherein customizing the at least one feature comprises customizing a user interface associated with each of the generic products in the subset.

7. The method of claim 6, wherein customizing the user interface comprises customizing a graphical user interface that is selected from among an operator control display screen or a screen provided at a remote management console.

8. The method of claim 1, further comprising providing a unique code identifying the customized feature, wherein the unique code is configured to not be changeable to prevent a change of the customized feature.

9. The method of claim 1, wherein the received generic products comprise generic storage products.

10. The method of claim 9, wherein the received generic storage products comprise generic tape library systems.

11. The method of claim 1, wherein providing the customization component comprises attaching a removable storage device to each generic product of the subset, wherein the removable storage device includes customization data accessible by the base software.

12. The method of claim 11, wherein attaching the removable storage device comprises attaching a Universal Serial Bus (USB) storage device.

13. An article comprising at least one computer-readable storage medium containing instructions that when executed cause a processor in a system associated with a first entity to:
    receive information specifying at least one customized feature for a first group of generic products received by the first entity from a supplier entity, where the first group has plural ones of the generic products, wherein the received information is received from a particular customer of the first entity, and wherein the first entity has a plurality of customers including the particular customer; and
    provide customization data associated with a customization component, wherein the customization data is based on the received information, wherein the customization data is accessible by base software in each of the first group of generic products to provide the at least one customized feature in each of the first group of generic products, wherein providing the at least one customized feature in each of the first group of generic products is performed without having the supplier entity perform the provision of the at least one customized feature in each of the first group of generic products.

14. The article of claim 13, wherein the customization component comprises a removable storage device that is pluggable into each of the first group of generic products.

15. The article of claim 14, wherein the removable storage device is a Universal Serial Bus (USB) storage device.

16. The article of claim 13, wherein the first entity is a selling customer of the supplier entity.

17. The article of claim 16, wherein the supplier entity is a manufacturer.

18. The method of claim 1, wherein causing execution of the base software in the subset of the generic products at the first entity to interact with the customization component causes customization of the at least one feature of the subset of generic products prior to the subset of generic products being provided to the particular customer.

19. The article of claim 13, wherein provision of the at least one customized feature in each of the first group of generic products is performed at the first entity prior to the first group of generic products being provided to the particular customer.

* * * * *